Figure 1:
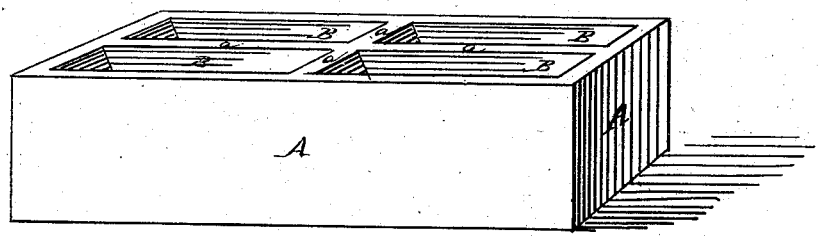

J. GREENAWALT & J. C. ANDERSON
MANUFACTURE OF BRICK.

No. 192,986. Patented July 10, 1877.

UNITED STATES PATENT OFFICE.

JACOB GREENAWALT, OF PITTSBURG, AND JAMES C. ANDERSON, OF ALLEGHENY, PENNSYLVANIA.

IMPROVEMENT IN THE MANUFACTURE OF BRICKS.

Specification forming part of Letters Patent No. 192,986, dated July 10, 1877; application filed May 19, 1877.

*To all whom it may concern:*

Be it known that we, JACOB GREENAWALT, of Pittsburg, and JAMES C. ANDERSON, of Allegheny city, Pennsylvania, have invented a new and useful Improvement in Manufacture of Brick, which improvement is fully set forth in the following specification, reference being had to the accompanying drawing.

Similar letters of reference indicate corresponding parts.

Our invention relates to the molding and forming of brick from clay, molded and formed when dry and in a powdered state; and it consists, mainly, in first preparing the clay to be molded into a fine, dry, and homogeneous powder, then subjecting the powder so prepared to heavy pressure or concussion within metallic molds or dies so constructed that wedge-shaped projections upon the dies penetrate and compress the clay within the molds into a net-work of ribs or partitions, by which the clay is forced together and compressed equally atom upon atom into a solid, firm, and compact mass, by reason of which pressure, and the displacement of the clay into thin bodies, the clay is made to adhere together in the form of a brick without the addition of moisture, and to maintain and hold the form so molded until placed in the kiln and burned, thereby imparting solidity to the brick, and obviating the objections heretofore experienced in the manufacture of brick from clay, when mixed with water in the paste state, the pores of the clay being saturated with water, and when so molded, the water being eliminated in the drying-out and burning processes, leaves the brick porous and brittle, or from clay molded direct from the clay-beds without being kneaded or mixed, although the pores in this state are also well saturated with water, owing to the large amount of water absorbed into and held suspended within the pores of the clay throughout the molding process, which, being freed in the drying-out or burning processes, leaves the brick also porous and brittle; and, by reason of the interstratified mineral washes and impurities in the clay, when molded in the natural state, which intervenes and prevents the clay from uniting in the burning process, renders the brick liable to shell or molder.

In carrying out our invention steel molds or dies are constructed with a series of wedge-shaped projections upon the matrixes of the same, corresponding with the openings B B in the brick. These projections in the molding operation enter the clay within the molds cleft like, and serve to compress the clay outwardly toward the outer shell A of the brick, and forming the ribs *a a* and openings B B, and by thus reducing the body of the clay within the mold, and forcing the same into thin and solid ribs, the clay will be made to adhere together and maintain the form of a brick.

The openings B B may be made of cone shape or of any other shape desired, it being sufficient for the purpose of the invention that they be made tapering for displacing and compressing the clay in an outward direction.

Figure 2:
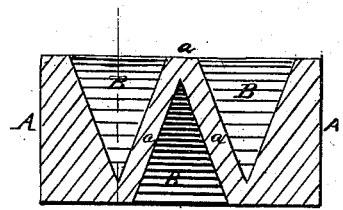
Figure 3:
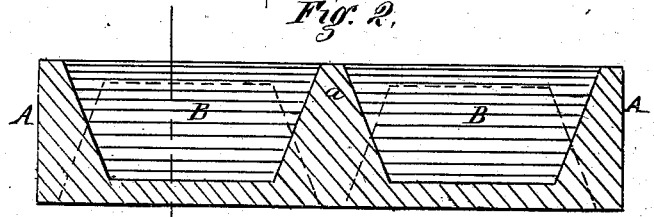

In the accompanying drawing, Figure 1 shows a perspective view of a brick formed by our process. Fig. 2 shows a cross-sectional view, and Fig. 3 a longitudinal sectional view, of the same.

The clay to be molded into brick is first thoroughly dried, then reduced to a fine powder, and placed in a revolving sieve for removing any course parts it may contain, and for thoroughly mixing the atoms of the clay into a homogeneous mass. The clay when so treated, and when dry, and in the powdered state, is passed into the metallic molds or dies above described, and subjected to a very heavy pressure or concussion, by which the clay within the molds will be forced into bricks of the desired form, which form will be retained by the brick after they are removed from the molds, and throughout the burning process. The atoms of the clay are thus brought into close contact, occupying the interstices or pores formerly occupied by the water, imparting to the bricks a close, firm, and solid body, and giving to them great strength, durability, and beauty of appearance. The openings B B also serve to lighten the brick, and to give a firm and secure hold for the mortar.

The brick being thus formed with a net-work of strengthening-ribs, and of such solid and firm texture, great strength is imparted to the walls of a building, rendering it also free of moisture by absorption.

Having thus described our invention, what we claim, and desire to secure by Letters Patent, is—

1. The improved process herein described for pressing homogeneous dry clay-powder into bricks, consisting in confining it in a mold of brick-form, and compressing it between the inclined sides of two opposing series of wedges and the sides of the molds, so as to evenly and thoroughly compact the powder, and form ridges and depressions in the upper and lower sides of the brick, substantially as set forth.

2. The within-described brick, having the wedge-shaped openings B B, ribs a a, and outer shell A, as a new article of manufacture, substantially as described.

J. GREENAWALT.
J. C. ANDERSON.

Witnesses:
J. B. LUCAS,
J. H. STEVENSON.